Jan. 13, 1931.  A. EGGER  1,788,567
DEVICE FOR CONNECTING MEASURING INSTRUMENTS AND METERS
TO ELECTRICAL ALTERNATING CURRENT INSTALLATIONS
Filed Nov. 25, 1929  2 Sheets-Sheet 1

Inventor:
Albert Egger,
By
Atty.

Patented Jan. 13, 1931

1,788,567

UNITED STATES PATENT OFFICE

ALBERT EGGER, OF AARAU, SWITZERLAND, ASSIGNOR TO URBAN BUGMANN, OF AARAU, SWITZERLAND

DEVICE FOR CONNECTING MEASURING INSTRUMENTS AND METERS TO ELECTRICAL ALTERNATING-CURRENT INSTALLATIONS

Application filed November 25, 1929, Serial No. 409,724, and in Germany December 20, 1928.

This invention relates to a device for connecting measuring instruments and meters to electrical alternating-current installations which permits of readily disconnecting the measuring instruments and meters as well as control instruments and short-circuiting current transformers associated therewith.

According to the invention this result is obtained in that terminals constituted by separate individual parts are arranged on an insulating body member which parts are adapted to be interconnected by connecting members insertable between the said parts so that each connecting member connects two adjacent terminal parts, suchwise, that by inserting or removing the said connecting members the measuring instruments and meters are adapted to be connected or disconnected respectively and the secondary coils of the current transformers with which they are associated are adapted to be short-circuited.

Conveniently, a base plate serving as the insulating body member is composed of individual plate elements arranged side by side, adapted to receive an individual terminal or a group of such terminals, respectively, and held together by fixing means passing through all the said plate elements.

Figure 1:
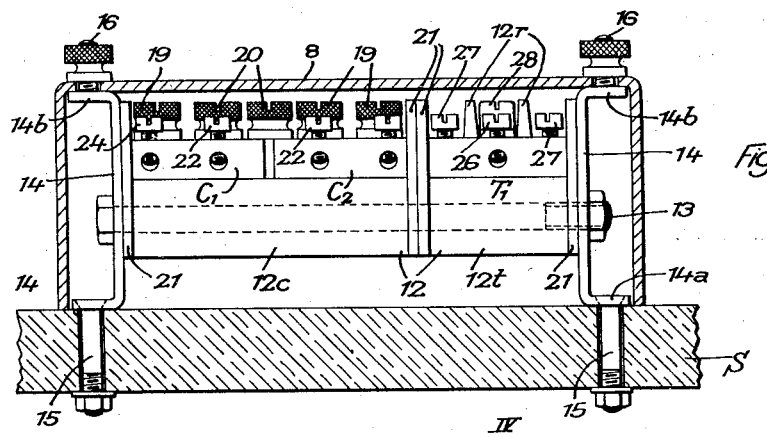
Figure 2:
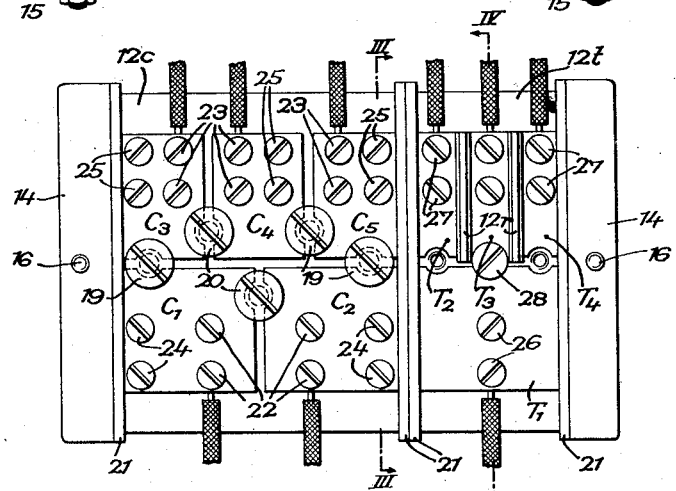
Figure 3:
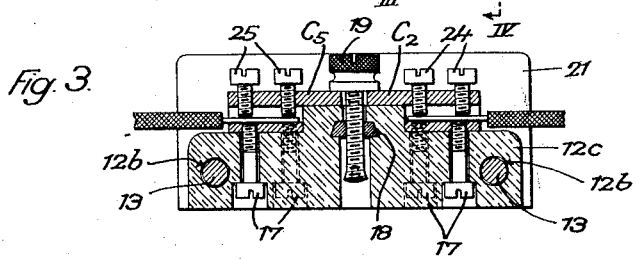
Figure 4:
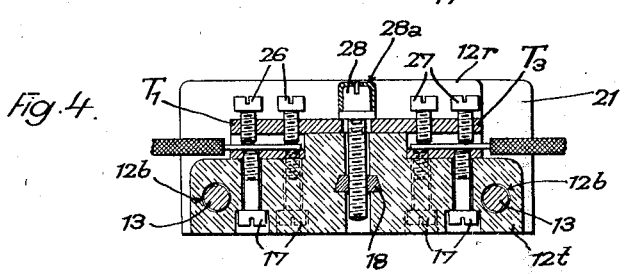
Figure 5:
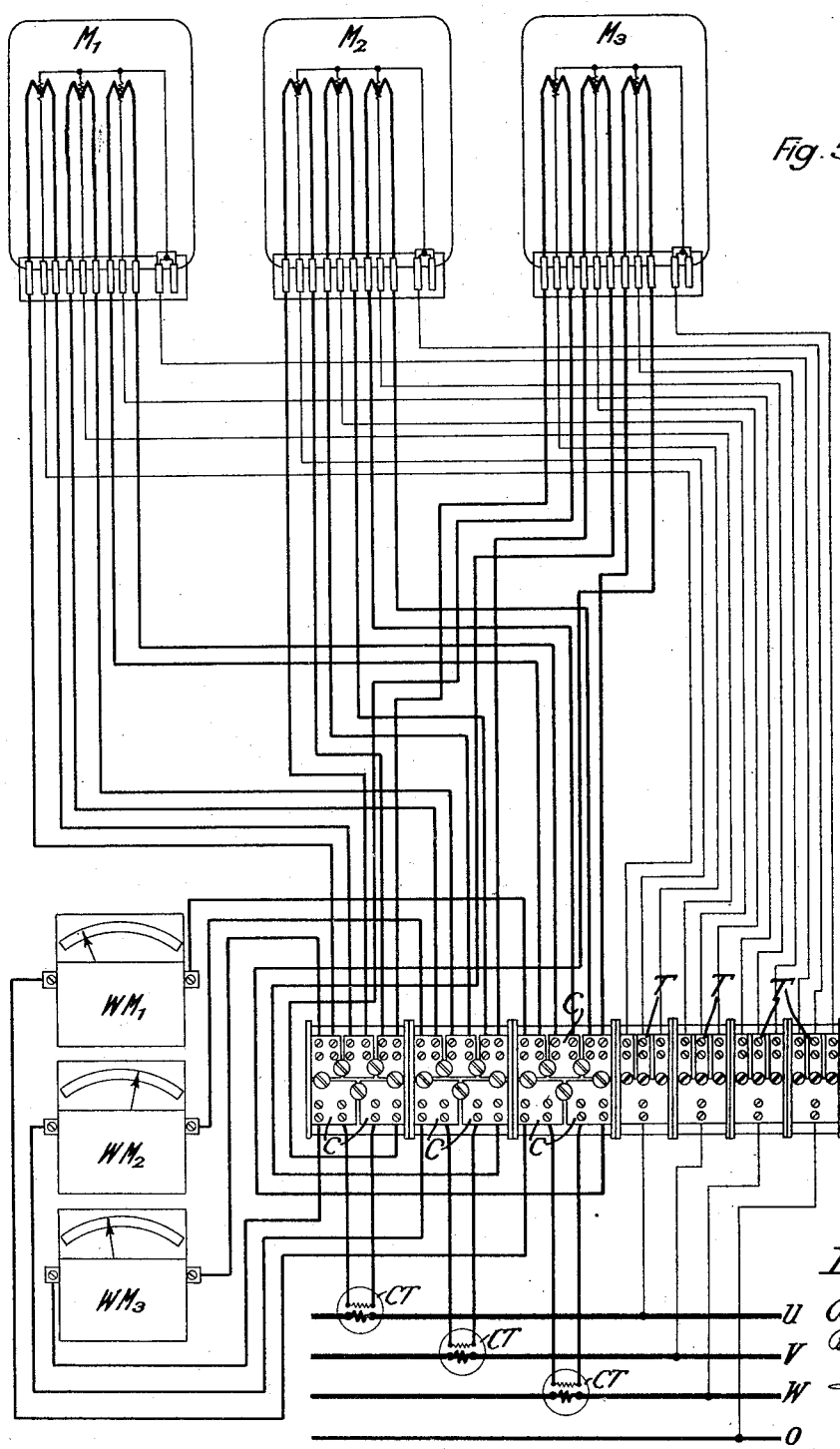

In the accompanying drawing an embodiment of the invention is shown, by way of example, in which:

Fig. 1 is a longitudinal elevation of a connecting device with the cover shown in section;

Fig. 2 a plan view of the same with the cover removed;

Fig. 3 a cross-section of the circuit terminals on the line III—III in Fig. 2;

Fig. 4 a cross-section of the voltage terminals on the line IV—IV in Fig. 2, and Fig. 5 a circuit diagram illustrating the application of the connecting device.

For simplifying purposes, only one part of a connecting device for a three-phase installation U, V, W including a neutral wire O is shown on the drawing (see Fig. 5) the three phases of which, in known manner, comprise three current transformers CT with which, in known manner, three meters M1, M2, M3 as well as recording and measuring instruments, not shown, are associated. Thereby, it is assumed that an installation of low tension is involved so that the conductors related to the voltage can be directly branched off from the main conductors of the system without the intermediary of the usual voltage transformers. In the circuit diagram all the conductors related to the current are indicated in thick lines and those related to the voltage in fine lines. Of the terminals shown in the circuit diagram (Fig. 5), in the Figs. 1 and 2 only one current terminal and one voltage terminal each serving for one phase are shown. The entity of terminals is mounted on a body member 12 of insulating material constituted by individual elements 12c and 12t. Between the elements 12c and 12t and at their outer end faces insulating inserts 21 are arranged which project beyond the lateral sides and the upper side of the body member, whereby the terminals of the individual phases are separated and insulated from each other in effective manner. Each element 12c and 12t is provided adjacent its exterior sides with two bores 12b perpendicularly disposed to its end faces. Screw bolts 13 inserted in the bores 12b unite the elements 12c and 12t to a firm base plate and serve at the same time for mounting the base plate thus formed between two U-shaped supporting members 14 which, by means of screw bolts 15 passed through the lower flanges 14a thereof, are fastened to the switch board S, whilst screws 16 arranged on the upper flanges 14b of the supporting members 14 serve for the fixation of the cover 8. Upon the element 12c for one current phase five terminal parts C1, C2, C3, C4 and C5 are provided. The first two serve for the connection of the incoming branch conduits for the current transformers, by means of corresponding binding screws 22, and the latter three for the connection of the outgoing branch conduits for the meter, the Amperemeter etc., by means of binding screws 23. Besides, each terminal part is provided with binding screws 24 or 25 respectively for the connection of branch conduits for test instruments. The individual terminal parts, the cross-section of which follows from Fig. 3, are each secured to the body member by means of two screws 17 which are introduced from the bottom side of the element 12c. Between the individual terminal parts in the element 12c screw nuts 18 are mounted, into which are screwed connecting or short-circuiting screws 19 or 20 respectively from above, the said screws effecting electrical connection of the corresponding terminal parts exclusively by the underside of their heads when they are completely tightened, whilst the shanks of the said screws clear the terminal parts, the sides of the same being cut out about the shanks of the screws as shown in dotted lines in Fig. 2. Thus, when a connection is to be interrupted the corresponding screws 19 or 20 respectively need not be removed, but merely loosened to the extent that the head is moved out of contact with the terminal parts. In the normal operation, the connecting screws 19 are tightened and the short-circuiting screws 20 loosened. The lower ends of the shanks of all the screws are provided with an enlarged portion which may be formed in such manner that a small hole is drilled in the shank of the screw and subsequent to the insertion of the shank in the nut 18 the end portion of the screw is enlarged by driving a pin into the hole in the screw. This enlargement prevents a total removal of the screw and a subsequent possible loosening of the same. Furthermore, the thickened end of the screw provides a firm engagement of the latter in the nut 18, whereby, under the influence of vibrations which are a common phenomenon with alternating current installations the screw is prevented from turning and self-tightening by moving downwards which might cause an undesired or false contact.

The branch conductors of the meter M of a phase are connected to the terminal parts C3 and C4 and a branch conductor of the meter of the one of the other two phases is connected to the terminal part C5.

On the element 12t of the body member carrying one of the four voltage terminals four terminal parts T1, T2, T3 and T4 are secured by means of screws 17 introduced from below. The terminal part T1 which serves for the connection of an incoming voltage branch conductor to the binding screw 26 extends over the full length of the plate element 12t, while the terminal parts T2, T3 and T4 which are separated from each other by the insulating ribs 12r and to which are connected the voltage branch conductors leading to the meters and measuring instruments of the three phases, by means of binding screws 27, each occupies but one third part of the available length. For the connection of the three terminal parts T2, T3 and T4 with the terminal part T1 connecting screws 21 are used to be screwed into nuts 18 from above which in the same manner as described in conjunction with the current terminals are embedded in the plate element 12t. The heads of the connecting screws 28 are provided with insulating caps 28a.

The circuit diagram Fig. 5 shows besides the normally connected meters M1, M2 and M3 three control wattmeters WM1, WM2, WM3 which serve for testing purposes. Depending upon the position occupied, thereby, by the connecting screws 19 or the short-circuiting screws 20 respectively either the meters or the control instruments or both can be connected and when all the instruments are disconnected the secondary circuit of the corresponding current transformer can be short-circuited by means of the short-circuiting screws between the terminal parts C1 and C2, in simple manner, so that the generation of undue voltages in the secondary circuit can be avoided.

I claim:

1. In a device for connecting measuring instruments and meters to electrical alternating current installations, the combination with, an insulating body member, current terminals secured to the said body member, each of the said current terminals consisting of five separate electrically insulated parts, of contact screws for the said insulated parts, the said contact screws providing electrical connection between the said terminal parts, the head of each of the said screws being pressed against two adjacent terminal parts when the screw is screwed in the said body member between the corresponding terminal parts, and of binding screws provided on each terminal part for the connection of test conductors, the whole arrangement permitting to connect meters and test instruments or to short-circuit the secondary coils of the current transformers when all the measuring instruments are disconnected respectively so as to avoid undue voltages in the current transformers.

2. In a device for connecting measuring instruments and meters to electrical alternating current installations, the combination with, an insulataing body member, voltage terminals secured to the said body member, each of the said voltage terminals consisting of four separate electrically insulated parts, one of the said terminal parts for the reception of an incoming voltage branch conductor being placed opposite the three other terminal parts for the connection of the outgoing voltage branch conductors, of contact screws for the said terminal parts and of insulated caps on the heads of the said contact screws, suchwise, that by screwing one of the said screws in the body member between each two of the oppositely disposed terminal parts electrical connection is provided between the said terminal parts by the head of the respective screw bearing on both of the said terminal parts.

3. In a device for connecting measuring instruments and meters to electrical alternating current installations, the combination with, an insulating base plate, the said base plate being constituted by individual plate elements, each of the said plate elements being adapted to receive a terminal, each of the said terminals being constituted by separate individual parts and secured to one of the said plate elements, two through-bolts for holding the said plate elements together, the said through-bolts traversing all the said plate elements, two supporting members, one for each end of the said base plate, a cover for the device, a switch board for mounting the device thereto, means for fixing the said cover to the said supporting members, means for fixing the said supporting member to the said switch board, of contact members for the said terminal parts, the said contact members being insertable between adjacent terminal parts so as to provide electrical connection with both of the corresponding terminal parts, suchwise, that by inserting or removing the said contact members the measuring instruments and meters are adapted to be connected or disconnected respectively and the current transformers with which they are associated are adapted to be short-circuited.

4. In a device for connecting measuring instruments and meters to electrical alternating current installations, the combination with, an insulating base plate, the said base plate being constituted by individual plate elements, each of the said plate elements being adapted to receive a terminal, each of the said terminals being constituted by separate individual parts and secured to one of the said plate elements, two through-bolts for holding the said plate elements together, two bores in each of the said plate elements, the said through-bolts traversing all the said plate elements in the said bores thereof, two supporting members, one for each end of the said base plate, a cover for the device, a switch board for mounting the device thereto, means for fixing the said cover to the said supporting member, means for fixing the said supporting member to the said switch board, of contact members for the said terminal parts, the said contact members being insertable between adjacent terminal parts so as to provide electrical connection with both of the corresponding terminal parts, suchwise, that by inserting or removing the said contact members the measuring instruments and meters are adapted to be connected or disconnected respectively and the current transformers with which they are associated are adapted to be short-circuited.

In testimony whereof I have signed my name to this specification.

ALBERT EGGER.